May 18, 1965 M. L. SCHWARZ 3,183,673
CLOSURE ADAPTER FOR MASTER CYLINDER
Filed March 11, 1964 2 Sheets-Sheet 1
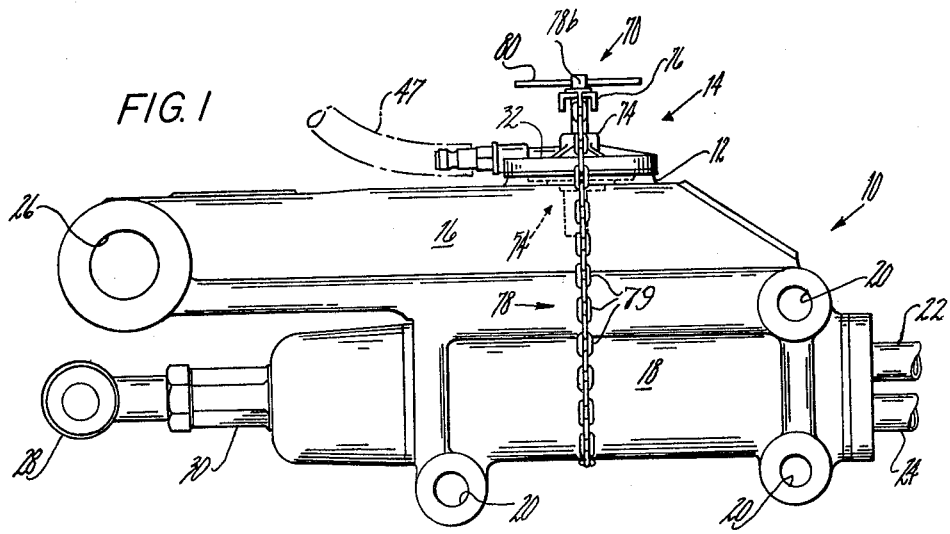
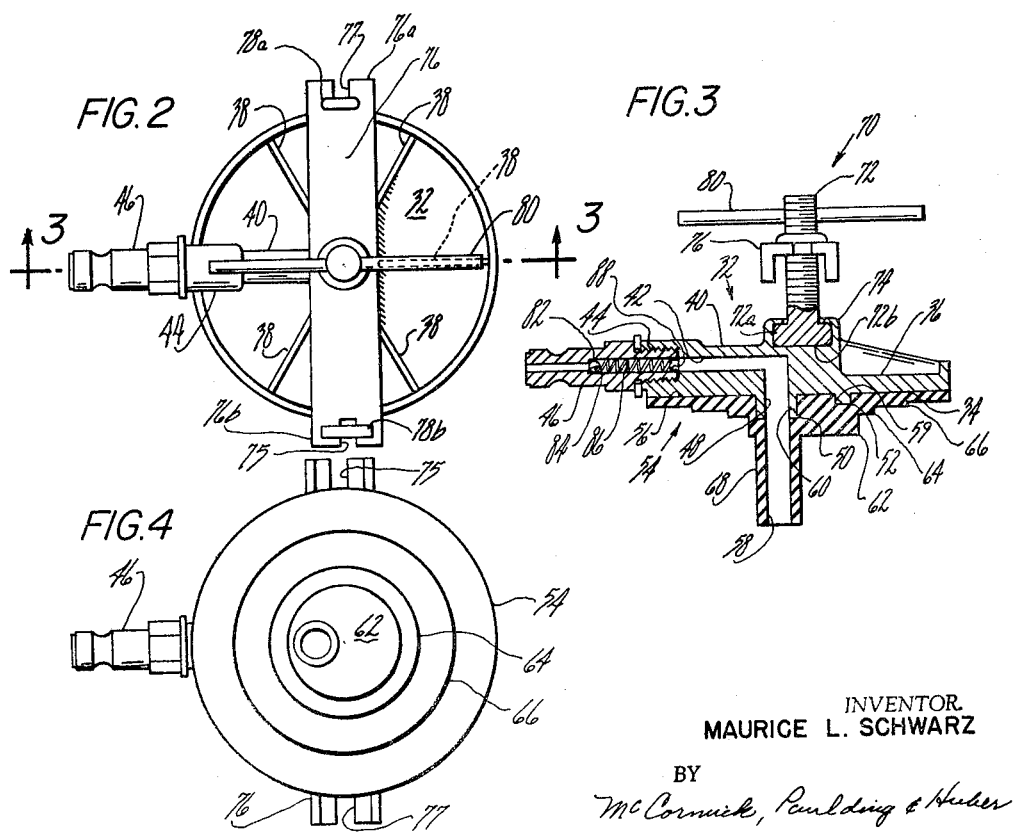
INVENTOR.
MAURICE L. SCHWARZ
BY McCormick, Paulding & Huber
ATTORNEYS May 18, 1965 M. L. SCHWARZ 3,183,673
CLOSURE ADAPTER FOR MASTER CYLINDER
Filed March 11, 1964 2 Sheets-Sheet 2
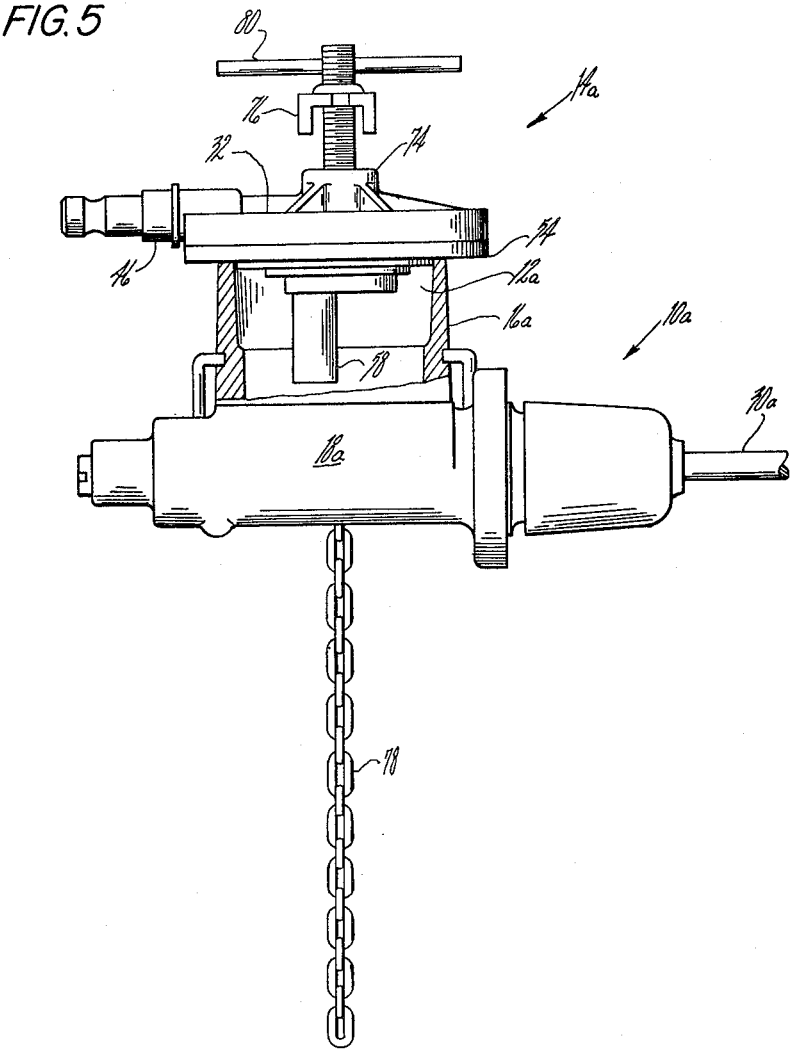

3,183,673
CLOSURE ADAPTER FOR MASTER CYLINDER
Maurice L. Schwarz, Middletown, Conn., assignor to The Eis Automotive Corporation, Middletown, Conn., a corporation of Connecticut
Filed Mar. 11, 1964, Ser. No. 351,099
10 Claims. (Cl. 60—54.6)

This invention relates to improvements in hydraulic brake servicing equipment, and, more particularly, to a closure adapter for the filler port of a brake master cylinder.

In servicing hydraulic brake systems it is frequently necessary to introduce fluid under pressure into any one of a wide variety of master cylinders. Since the filler ports of these master cylinders must be sealed as the pressurized fluid is so introduced there is a need for a single closure which can not only supply fluid under pressure, but which is also adapted to seal off these ports of various sizes from atmospheric pressure. Accordingly, it is an object of the present invention to provide an adaptable filler port closure which can so seal filler ports of various sizes while permitting hydraulic fluid to be introduced therein.

It is also an object of the present invention to provide a master cylinder closure adapter which prevents excess hydraulic fluid from spilling when the closure is removed from the filler port.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Of the drawing:

FIG. 1 is a side view of a closure adapter of the present invention mounted on a typical hydraulic brake master cylinder of the type used on present day automobiles;

FIG. 2 is a top view of the FIG. 1 closure;

FIG. 3 is a sectional view of the FIG. 1 closure taken along the line 3—3 of FIG. 2;

FIG. 4 is a bottom view of a sealing member such as that shown in FIGS. 1–3; and FIG. 5 is a side view of the FIG. 1 closure mounted on a more recent hydraulic brake master cylinder.

Referring now to FIG. 1 with greater particularity, a typical automotive brake master cylinder 10 is there shown as having a filler port 12 which is ordinarily closed by a filler cap (not shown). In this view such a cap has been replaced by a closure adapter of the present invention indicated generally at 14. The master cylinder is of well known construction and hence need only be described briefly herein. The master cylinder 10 has an upper portion 16 which defines a reservoir for storing hydraulic fluid and a lower portion 18 which houses the various pistons and metering valves normally found in an automotive brake master cylinder. Various mounting holes 20, 20 are also provided and two hydraulic lines 22 and 24, are shown for transmitting hydraulic pressure from the master cylinder to the front and rear wheels of an automobile. A hole 26 provides a pivotable support for the brake pedal arm (not shown) and the eye 28 on the end of the piston rod 30 is adapted to be connected to such an arm for operation of the internal pistons and valves in response to pivotal movement of the brake pedal arm. A more recent cylinder 10a is shown in FIG. 5 wherein similar parts are indicated by similar reference numerals to which the letter "a" has been subscribed.

Turning now to the construction of the closure adapter 14, a circular cover member 32 of die cast metal or other similar material is shown in FIG. 3 as having a substantially planar lower side 34 and a webbed upper side 36. As shown in FIG. 2, five of these radially extending webs 38, 38 are generally similar but a sixth web 40 is substantially thicker in cross section than the relatively narrow webs 38, 38 and defines a radially extending bore 42 therein. As best shown in FIG. 3, an outer portion 44 of said radial bore 42 is threaded to receive a standard hydraulic fitting 46.

The fitting 46 is preferably provided with a check valve in the form of a steel ball 82 which is urged onto an annular seat 84 defined in the bore of the fitting by a compression spring 86. An annular grommet 88 is attached to the threaded end of the fitting to provide a radially extending flange at its inner end against which the spring 86 can act to so urge the ball 82. This fitting is adapted to be connected to a source of hydraulic fluid under pressure by piping means 47 for servicing or bleeding the automobile hydraulic system as shown in FIG. 1.

The cover member 32 also defines a generally axially extending but eccentrically located bore 48 which communicates at its inner end with the inner end of said radially extending bore 42 to provide a fluid passageway through the cover member 32. As best shown in FIG. 3, this cover passageway is further defined by a first cylindrical stud 50 of annular cross section located at some radial distance from the axial center of the circular cover 32. A second cylindrical stud 52 somewhat shorter than said annular stud 50 is also provided at the lower side 34 of this cover for the purpose to be discussed hereinbelow.

The closure adapter 14 also comprises a circular sealing member 54 of diameter equivalent to that of the cover 32 and having an upper side 56 which is generally planar and adapted to sealingly engage the lower planar side 34 of the cover. An axially extending bore 58 is defined by the sealing member 54 and has an upper portion 60 which is adapted to receive the annular stud 50. As so arranged, the sealing member has a passageway therethrough which communicates at its upper end with the lower end of the aforementioned cover passageway providing a path for the flow of hydraulic fluid through the closure. A second axial bore 59 extends downwardly into the upper side of said sealing member 54 but does not extend through the same. The purpose of this bore is to receive the second stud 52. When both these studs 50 and 52 are received in their respective bores 60 and 59, the cover 32 will be properly located with respect to the sealing member 54.

A series of concentrically arranged cylindrical plugs 62, 64 and 66 of increasing diameters are defined by the lower side of the sealing member 54, and as shown in FIG. 1, the largest plug 66 is in sealing engagement with the filler port 12 of the master cylinder 10. This sealing member is preferably fabricated from a resilient gasket material of rubberlike consistency so as to resist the corrosive action of most hydraulic fluids and to provide a good seal against leakage of such fluids. These cylindrical plugs 62, 64 and 66 are stepped axially so that each of the smaller diameter plugs, for example, 62, extends downwardly beyond the next larger diameter plug 64. As so constructed, the closure 14 can be inserted in any one of a variety of master cylinder filler ports. The advantages to such a versatile closure are obvious. Not only is the automobile mechanic's need for specialized tools minimized, but the time required by him in servicing a particular automobile brake system is also materially reduced since he is not required to try various and sundry filler port closures before beginning actual servicing of the system.

A tubular projection 68 is integrally formed on the lowermost face of the smallest diameter plug 62 and defines a continuation of the aforementioned axially extending bore 58 in the sealing member 54. As mentioned hereinabove, this bore 58 is offset radially from the center line of the member 54. This radial displacement has been found necessary in order that the tubular projection 68 does not interfere with the internal structure characteristic of certain types of master cylinders By providing such a projection on the closure of the present invention, it has been found that when the level of fluid in the reservoir portion of the master cylinder reaches the lowermost end of this projection 68, aeration of the fluid is minimized. In view of the undesirable effects of entrapping air in an automobile hydraulic brake system it is obvious that the tubular projection serves a very valuable function in that it eliminates excessive foaming during the filling operation, and hence reduces the likelihood of entrapping air in the system.

It will be apparent that the air which is trapped in the reservoir portion of the master cylinder will be pressurized during the filling operation. After a normal servicing has been completed, the piping 47 can be removed from the fitting 46 without any tendency for fluid entrapped in the closure to spray outside the master cylinder as a result of the above-described check valve 82. It is desirable that this step be performed prior to removal of the closure from the filler port since the trapped air can be depressurized slowly at a controlled rate during the latter operation as a result of the novel clamping means provided therefor.

Closure clamping means, indicated generally at 70 in FIGS. 1 and 3, are provided for releasably securing the closure 14 to the master cylinder 10. As shown, said clamping means comprise a generally vertically arranged threaded post 72 rotatably supported in a central hub portion 74 of the cover 32. This post may be conveniently fabricated from a conventional machine screw, the head portion thereof being turned to provide a cylindrical bearing surface 72a and the end thereof then faced to provide an end bearing surface 72b. Also comprising part of said clamping means is a channel-shaped beam 76 which is slightly longer than the diameter of the cover 32 and is threadably received on this post. Another part of said clamping means is a chain or strap 78 which is attached to one end 76b of the beam 76. As so arranged, this strap 78 can be passed around the lower portion of the master cylinders as shown in FIGS. 1 and 5 and the free end 78a of the strap can then be releasably secured to the other end 76a of the beam 76. In the construction shown, the latter end 76a of this beam is provided with a slot 77 and the strap 78 has a plurality of links 79, 79 any one of which can be inserted in this slot 77 providing a rough adjustment for accommodating master cylinders of various sizes and shapes The fixed end 78b of this strap is held in a similar slot 75 at the first-mentioned end of the beam 76 and is secured thereto by deforming the end link as shown. Also comprising part of said closure clamping means is a crank arm 80 which is attached at its midpoint to the upper end of the threaded post 72. This arm 80 provides a manual means for rotating the post 72 so as to tighten the strap 78. As so arranged, the threaded post provides a fine adjustment which is conveniently operable from atop the closure 14 by use of the arm 80. The closure can thus be quickly and easily installed with any master cylinder regardless of size. As mentioned hereinabove, this closure is also adapted for use with filler ports of various different sizes. These features are seen to be efficiently combined in a master cylinder closure adapter which fulfils a long felt need among the mechanics who must service the myriad of automobiles presently extant on today's highways.

The invention claimed is:

1. A closure for the filler port in a brake master cylinder, said closure comprising rigid a cover member having a passageway therethrough, means for connecting one end of said passageway to a source of hydraulic fluid under pressure, a resilient sealing member defining a plurality of cylindrical plugs at the lower side thereof, an upper side of said sealing member adapted to sealingly engage the lower side of said cover, said cylindrical plugs being axially stepped so that the smallest diameter plug extends downwardly beyond the next larger diameter plug, said sealing member defining a generally axially extending passageway communicating with the lower end of said cover passageway, and clamping means carried by said cover member for releasably securing said closure to a master cylinder with one of said plugs sealingly inserted in the filler port of said master cylinder.

2. A closure for the filler port of a brake master cylinder as set forth in claim 1 and including a tubular projection integrally formed on the lowermost face of the smallest cylindrical plug and nonconcentric therewith, said tubular projection being in communicating with said sealing member passageway so as to define a continuation thereof.

3. A closure for the filler port of a brake master cylinder as set forth in claim 1 wherein said clamping means includes a threaded post rotatably supported in the upper side of said cover member, a beam threadably received on said post, a strap connected to one end of said beam and adapted to be passed around said master cylinder when the closure is inserted in the filler port thereof, another end of said beam adapted to receive the free end of said strap, and means for rotating said post to tighten said strap whereby said filler port is sealed by one of said plugs.

4. A closure for the filler port in a brake master cylinder, said closure comprising a circular metal cover defining a radially extending bore, said bore having a threaded end at the periphery of said cover for connection with a source of hydraulic fluid under pressure, said cover further defining an axially extending bore in communication with said radially extending bore to define a passageway through the lower side of said cover, a circular sealing member of resilient material defining a plurality of concentrically arranged cylindrical plugs at a lower side thereof, said cylindrical plugs being axially stepped so that the smaller diameter plugs extend downwardly beyond the next larger diameter plug, said sealing member having an upper side adapted to seat against the lower side of said cover, said sealing member refining an axially extending bore adapted to communicate with the lower end of said axial cover bore and extending downwardly through said smallest plug, and clamping means carried by said cover for releasably securing said closure to a master cylinder with one of said plugs sealingly inserted in the filler port of said master cylinder.

5. A closure for the filler port of a brake master cylinder as set forth in claim 4 and including a tubular projection integrally formed on the lowermost face of the smallest cylindrical plug and arranged nonconcentrically with respect to said plug, the lower end of said sealing member bore being in communication with the bore of said tubular projection to define a passageway through the sealing member.

6. A closure for the filler port of a brake master cylinder as set forth in claim 4 wherein said clamping means includes a threaded post rotatably supported in the upper side of said cover member, a beam threadably received on said post, a strap connected to one end of said beam and adapted to be passed around said master cylinder when the closure is inserted in the filler port thereof, another end of said beam being adapted to receive the free end of said strap, and means for rotating said post to tighten said strap whereby said filler port is sealed by one of said plugs.

7. A closure for the filler port of a brake master cylinder as set forth in claim 6 wherein said threaded post is rotatably supported in the center of the upper side of said circular cover, and said axially extending cover bore is radially displaced from the center of said cover.

8. A closure for the filler port of a brake master cylinder as set forth in claim 7 and including sealing member locating means at the lower side of said cover for assuring that said axially extending bores in said cover and said sealing member are properly aligned for the transmission of hydraulic fluid therethrough.

9. A closure for the filler port of a brake master cylinder as set forth in claim 8 wherein said sealing member locating means comprises at least two cylindrical studs depending downwardly from the lower surface of said cover, and two cylindrical openings defined by said sealing member to receive said studs.

10. A closure for the filler port of a brake master cylinder as set forth in claim 9 wherein one of said cylindrical studs is annular in cross section and defines the lower end of said axial cover bore, and said sealing member bore having an upper cylindrical portion of appropriate diameter for receiving said annular stud.

References Cited by the Examiner

UNITED STATES PATENTS

| | | | |
|---|---|---|---|
| 1,048,546 | 12/12 | Ketcham | 141—367 X |
| 1,893,102 | 1/33 | Packer | 292—260 |
| 2,670,874 | 3/54 | Wilkerson | 60—54.6 X |
| 2,735,601 | 2/56 | Barrett | 141—285 X |
| 2,777,293 | 1/57 | Hawkins | 60—54.6 |
| 2,812,877 | 11/57 | Lescure | 292—260 X |

FOREIGN PATENTS 669,200    8/63    Canada.

JULIUS E. WEST, *Primary Examiner.*

EDGAR W. GEOGHEGAN, *Examiner.*